US010031972B2

(12) United States Patent
Koh et al.

(10) Patent No.: US 10,031,972 B2
(45) Date of Patent: Jul. 24, 2018

(54) WEB INFORMATION PROVIDING SYSTEM AND WEB INFORMATION PROVIDING PROGRAM

(71) Applicant: Appli-Smart Co., Ltd., Tokyo (JP)

(72) Inventors: Kyotetsu Koh, Tokyo (JP); Eiji Sakaguchi, Tokyo (JP)

(73) Assignee: APPLI-SMART CO., LTD., Tokyo (JP)

( * ) Notice: Subject to any disclaimer, the term of this patent is extended or adjusted under 35 U.S.C. 154(b) by 133 days.

(21) Appl. No.: 14/353,247

(22) PCT Filed: Oct. 22, 2012

(86) PCT No.: PCT/JP2012/077204
§ 371 (c)(1),
(2) Date: Apr. 21, 2014

(87) PCT Pub. No.: WO2013/058398
PCT Pub. Date: Apr. 25, 2013

(65) Prior Publication Data
US 2014/0258329 A1  Sep. 11, 2014

(30) Foreign Application Priority Data
Oct. 21, 2011 (JP) .................. 2011-231636

(51) Int. Cl.
*G06F 17/30* (2006.01)
(52) U.S. Cl.
CPC .... *G06F 17/30864* (2013.01); *G06F 17/3089* (2013.01); *G06F 17/30616* (2013.01); *G06F 17/30684* (2013.01); *G06F 17/30696* (2013.01)

(58) Field of Classification Search
CPC ......... G06F 17/30637; G06F 17/30707; G06F 17/30864; G06F 17/3069; G06F 17/30985;
(Continued)

(56) References Cited

U.S. PATENT DOCUMENTS 5,307,266 A * 4/1994 Hayashi ............ G06F 17/30011
707/E17.008
7,272,637 B1 * 9/2007 Himmelstein .... G06F 17/30389
707/999.01
(Continued)

FOREIGN PATENT DOCUMENTS

JP 2000-339340 A 12/2000
JP 2005-044295 A 2/2005
(Continued)

*Primary Examiner* — Srirama Channavajjala
(74) *Attorney, Agent, or Firm* — Muncy, Geissler, Olds & Lowe, P.C.

(57) ABSTRACT

Web information providing system and method are provided to search for Web sites and content that provide services given the keywords input by a user and displays the linked data. When a user inputs the search keywords into a keyword input unit, an entry decision unit determines the entered formats of the input keywords. An attribute decision unit determines the attributes from the content represented by the keywords corresponding to the format of the entry. A search unit searches for Web sites and content that provide the services corresponding to the attributes and displays the linked data of the searched Web sites and content on a display unit. If the linked data displayed on the display unit is selected, an access unit accesses the Web site and instructs the provision of the service indicated by the entry content of the keywords.

17 Claims, 10 Drawing Sheets

(58) Field of Classification Search
CPC ........... G06F 17/30988; G06F 17/3089; G06F 17/30672; G06F 17/3064; G06F 17/30654; G06F 17/30616; G06F 17/30684; G06F 17/30696
See application file for complete search history.

(56) References Cited

U.S. PATENT DOCUMENTS

| | | | |
|---|---|---|---|
| 7,769,648 B1* | 8/2010 | Nolan | G06Q 10/087 705/14.54 |
| 2002/0156779 A1* | 10/2002 | Elliott | G06F 17/3087 |
| 2004/0064200 A1* | 4/2004 | Kondo | G06F 17/30876 700/19 |
| 2004/0103097 A1* | 5/2004 | Wesinger, Jr. | G06F 17/3089 |
| 2004/0117353 A1* | 6/2004 | Ishag | G06F 17/30864 |
| 2005/0114317 A1* | 5/2005 | Bhide | G06F 17/30864 |
| 2005/0125400 A1* | 6/2005 | Mori | G06F 17/30864 |
| 2005/0228780 A1* | 10/2005 | Diab | G06F 17/30864 |
| 2006/0004725 A1* | 1/2006 | Abraido-Fandino | G06F 17/30864 |
| 2006/0100788 A1* | 5/2006 | Carrino | G06Q 30/06 702/19 |
| 2006/0173617 A1* | 8/2006 | Sladky | G01C 21/3679 701/426 |
| 2006/0184566 A1* | 8/2006 | Lo | G06F 17/30038 |
| 2006/0248061 A1* | 11/2006 | Kulakow | G06F 17/30905 |
| 2006/0271524 A1* | 11/2006 | Tanne | G06F 17/30648 |
| 2007/0055649 A1 | 3/2007 | Tsuzuki et al. | |
| 2007/0088507 A1* | 4/2007 | Haberlen | G06Q 40/025 702/19 |
| 2007/0174133 A1* | 7/2007 | Hearn | G06Q 30/0603 705/26.62 |
| 2007/0192300 A1 | 8/2007 | Reuther et al. | |
| 2008/0114607 A1* | 5/2008 | Amer-Yahia | G06Q 30/02 705/14.4 |
| 2009/0254547 A1* | 10/2009 | Hirota | G06F 17/30 |
| 2009/0292677 A1* | 11/2009 | Kim | G06F 17/3089 |
| 2010/0036838 A1* | 2/2010 | Ellis | G06F 17/30722 707/708 |
| 2010/0121832 A1* | 5/2010 | Adsera Bertran | G06F 17/30637 707/706 |
| 2011/0010376 A1 | 1/2011 | Kawauchi | |
| 2011/0137880 A1* | 6/2011 | Blais | G06F 17/30398 707/706 |

FOREIGN PATENT DOCUMENTS

| | | |
|---|---|---|
| JP | 2006-107200 A | 4/2006 |
| JP | 2007-234008 A | 9/2007 |
| JP | 2009-258808 A | 11/2009 |
| JP | 2010-009457 A | 1/2010 |
| JP | 2011-018256 A | 1/2011 |
| WO | WO 2005/122016 A1 | 12/2005 |

* cited by examiner

WEB INFORMATION PROVIDING SYSTEM AND WEB INFORMATION PROVIDING PROGRAM

TECHNICAL FIELD

The present invention relates to a Web information providing system and Web information providing method configured so that, when a user inputs a search keyword, it is possible to provide link destination data of a Web site or content associated with this keyword.

BACKGROUND ART

Conventionally, to search Web sites from which a user wants to obtain information on the internet, a required Web site is accessed by opening a search site to use a search engine, and inputting a search keyword. In addition, in the case of wanting to study the meaning of words or special phrases, an information site such as a dictionary site is opened. However, there have been cases where Web sites must be visited while selecting information appropriately, and thus time has been required to finally arrive at the information desired by the user from among countless information.

For this reason, a search service providing system has been known that provides link destination data serving as candidates automatically when inputting search keywords from an information terminal through a communication network (for example, refer to Patent Document 1). In this case, by displaying link destination data in an order decided based on a fixed condition such as index amount or update date and time with the information search server, it has been made possible to give Web sites having a high possibility of being selected by the user as candidates.

[Patent Document 1] Japanese Unexamined Patent Application, Publication No. 2006-107200

DISCLOSURE OF THE INVENTION

Problems to be Solved by the Invention

However, the motivations for users to search Web sites varies, and with the above-mentioned prior art, there is a deficiency in that Web sites not serving one's aim are given high ranking as candidates according to the user. For example, at this time, for a user having a purpose such as wanting to know map information, wanting to reserve a hotel, or wanting to know information of the last train, and cases such as searching for Web sites providing such services have comparatively high urgency; however, with the Web site search system according to the above-mentioned conventional technology, since various Web sites associated with the search keyword are given, it requires time to reach a Web site providing the desired service, and thus there is a problem in the aspect of convenience.

The present invention has an object of providing a Web information providing system and Web information providing method that, by inputting a keyword related to a service that a user wants to be provided, can search Web sites or content providing a service accordingly, and display link destination data thereto.

Means for Solving the Problems

In order to solve the above-mentioned problem, a Web information providing system according to the present invention includes: a keyword input unit to which a keyword for searching is inputted; an entry decision unit determining an entry format of the keyword inputted; an attribute decision unit determining contents expressed by the keyword according to the entry format, and deciding an attribute of the keyword from the contents; a search unit searching for a Web site and content providing a service according to the attribute; a display unit displaying link destination data of the Web site and the content thus searched; and an access unit accessing a corresponding Web site according to selection of the link destination data displayed by the display unit.

Herein, it is characterized in that the access unit instructs provision of a service indicated by display contents of the keyword to the Web site being accessed. In addition, it is characterized in that the link destination data is an icon.

Further, it is characterized in that the attribute decision unit, if contents expressed by the keyword match a noun stored in advance when the entry format of the keyword is language, decides the attribute of the keyword based on the noun matched. In addition, it is characterized in that the attribute decision unit, when the entry format of the keyword is numeric character, decides the attribute of the keyword based on the number of digits of the numeric character or the numeric character in a specific digit. Moreover, it is characterized in that the attribute decision unit, when the entry format of the keyword is configured by at least two types among numeric character, symbol and alphabet, decides the attribute of the keyword based on a sequence thereof.

Further, it is characterized in that, when a plurality of keywords is inputted to the keyword input unit, the entry decision unit determines entry thereof for each of the keywords, and the search unit searches for corresponding Web sites and contents based on a combination of the attributes for each of the keywords decided by the attribute decision unit.

Additionally, it is characterized in that the display unit displays link destination data of the Web site or the content searched by the search unit, as well as link destination data of a search site having a search engine. In this case, the display unit displays following a predetermined priority order when there is a plurality of link destination data. In addition, it is characterized in that the display unit also displays link destination data of a search site having a search engine, irrespective of whether or not there is link destination data of the Web site or the content being displayed. Moreover, it is characterized in that the display unit categorizes and displays the link destination data.

Additionally, it is characterized by including a schedule input unit, when the attribute decision unit decides an attribute of the keyword as a date or time, inputting a schedule of the date or the time. It is thereby possible for processing of schedule input to also be carried out during processing of Web information provision.

A Web information providing method according to the present invention, including: a step of determining an entry format of a keyword that has been inputted; a step of determining contents expressed by the keyword according to the entry format, and deciding an attribute of the keyword from the contents; a step of searching for a Web site or content providing a service according to the attribute; and a step of displaying link destination data of the Web site or the content thus searched.

Additionally, it is characterized in that the step of deciding the attribute of the keyword, if the contents expressed by the keyword match a noun stored in advance when the entry format of the keyword is language, decides the attribute of the keyword from the noun matched. Moreover, it is characterized in that, when the entry format of the keyword is numeric character, the attribute of the keyword is decided based on the number of digits of the numeric character or a numeric character in a predetermined digit.

In addition, it is characterized in that, when the entry format of the keyword is configured by at least two types among numeric character, symbol and alphabet, the attribute of the keyword is decided based on a sequence thereof.

Effects of the Invention

The Web information providing system and Web information providing method according to the present invention have made it possible to, based on the entry format of a keyword inputted, determine the contents expressed by this keyword, decide an attribute of the keyword according to the contents thereof, search for a Web site or content providing a service according to the attribute and display link destination data, and when link destination data is selected, access the corresponding Web site or content.

According to this configuration, a Web information providing system and Web information providing method with high convenience to the user is provided that, by inputting a keyword, can simply search for a Web site or content providing a service according to this keyword.

EXPLANATION OF REFERENCE NUMERALS

10 Web information providing system
11 keyword input unit
13 attribute decision unit
14 search unit
15 display unit
16 database
18 access unit

PREFERRED MODE FOR CARRYING OUT THE INVENTION

Figure 1:
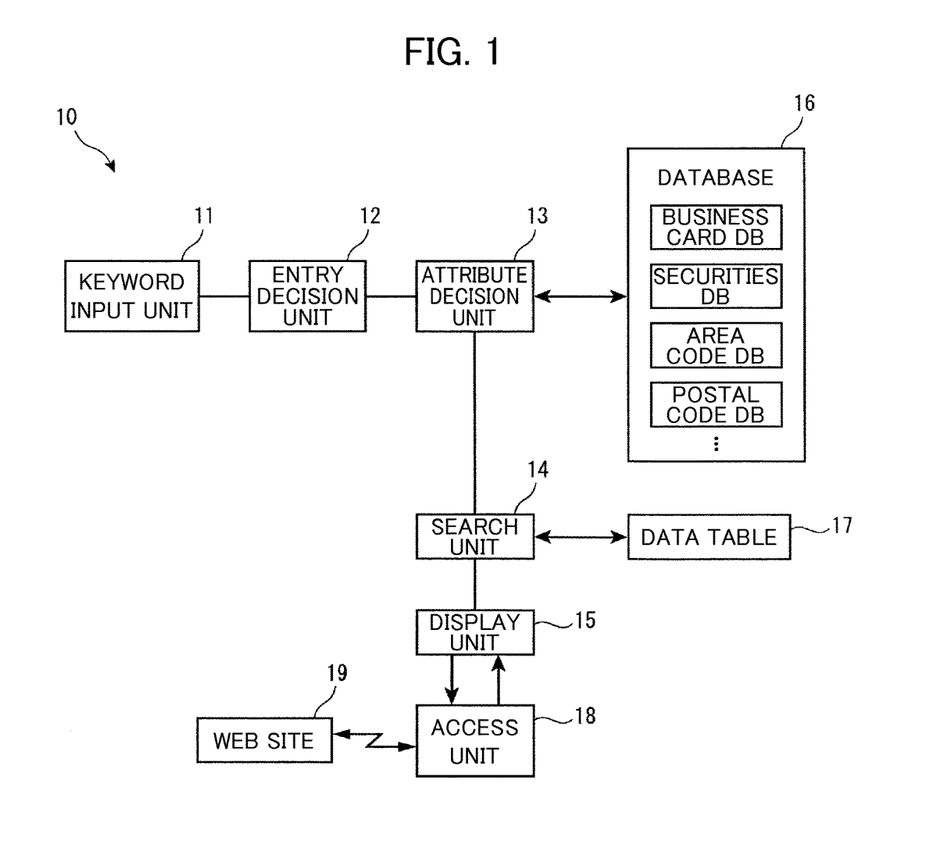
FIG. 1 is a block diagram showing the configuration of a Web information providing system according to the present invention.

An embodiment of the present invention will be explained based on the drawings. FIG. 1 shows the configuration of a Web information providing system according to the present invention. The Web information providing system 10 shown in FIG. 1 includes a keyword input unit 11, an entry decision unit 12, an attribute decision unit 13, a search unit 14, a display unit 15, a database 16, a data table 17, and an access unit 18 that accesses a Web site 19.

A keyword for searching is inputted by the user to the keyword input unit 11. When the keyword is inputted, the entry decision unit 12 performs determination as to whether the entry of this keyword is language (Japanese), is a numeric character, or a combination of numeric character/symbol/alphabet based on the entry of the keyword.

The attribute decision unit 13 receives the determination of this entry and decides the attribute thereof from the contents expressed by the keyword. In other words, various types of attributes are established beforehand, and from among these, one or a plurality of corresponding attributes is selected and decided as the attribute of this keyword.

If the entry is language, the keyword is set to express a noun, and the attribute decision unit 13 examines the matches with the noun retained in advance in a noun DB of the database 16. Then, if matching, the attribute of the keyword is decided according to the expressed contents of this noun. Proper nouns such as a well-known place name, a person's name, a company name, a stage name and a country name, or common nouns widely used such as food names and occupations are stored in the noun DB. Therefore, when comparing with nouns retained in the noun DB and determining that the keyword represents "Shinjuku", the attribute decision unit 13 selects "place name" or "station name" from among the predetermined attributes to decide the attribute of this keyword. It should be noted that the language is not limited to Japanese, and may be another language; however, in this case, it is necessary to prepare a noun DB according to this language.

If the entry is a numeric character, the contents expressed by the sequence of keywords is determined according to the number of digits, numeric character in a specific digit, etc., and the attribute thereof is decided from the determined contents. For example, there is a possibility of a two-digit numeric character starting from 0 (or three-digit, four-digit, five-digit) being a telephone area code, and if comparing with a telephone area code data DB of the database 16 and matching, the region indicated by this telephone area code is decided as the attribute. In addition, there is a possibility of being the securities code of a stock if a four-digit numeric character, and if comparing with the securities DB of the database 16 and matching, "stock" and "company" are selected from among the predetermined attributes to decide the attribute of this keyword. Furthermore, also if representing a stage name with 1 or a multi-digit numeric character itself, the attribute can be decided by selecting from these.

If the entry is a combination of two or more among numeric character/symbol/alphabet, the attribute decision unit 13 can decide the attribute from the arrangement thereof. For example, there is a possibility of being a postal code if from the first digit to the third digit are numeric characters, a hyphen is subsequently put, and a four-digit numeric character continues, and if comparing with a postal code DB of the database 16 and matching, a region indicated by this postal code or "mail" is decided as the attribute. In addition, there is a possibility of being a postal code even with a keyword of only the first digit to third digit being numeric characters.

Other than the above, various data to be compared for deciding the attributes of keywords are retained in the database 16.

The search unit 14 searches corresponding Web sites and contents from the data table 17 based on the decided attribute. The data table 17 stores link destination data of a map search site, route search site and hotel reservation site on the Internet to be contrasted with the "place name" and "station name" of the attribute, and. For example, if "Shinjuku" is inputted as the keyword, in order for the attribute decision unit 13 to decide the attributes thereof as "place name" or "station name", the search unit 14 reads link destination data of a map search site, a route search site and a hotel reservation site from the data table 17.

Then, the display unit 15 displays the link destination data read by the search unit 14, the access unit 14 accesses the link destination if the link destination data displayed by the display unit 15 is selected to display a Web page of the Web site 19 on the display unit 15.

It is considered that the user having inputted "Shinjuku" into the keyword input unit 11 has a request such as "want to know a map of Shinjuku", "want to make a reservation at a Shinjuku hotel", or "want to study public transportation of Shinjuku" and is making a search, and by the user selecting any of a map search site, route search site and hotel reservation site depending on the demanded contents, the access unit 18 accesses the Web site 19 selected, and causes a Web page of this Web site 19 to be displayed on the display unit 15.

The access unit 18 instructs to the Web site 19 the provision of a service of then keyword to the keyword input unit 11, when accessing the Web site 19. Therefore, for example, in the case of the user selecting link destination data of a map search site, the access unit 18 sends to the Web site 19, which is a map search site, an instruction so as to display a map of "Shinjuku" which is the keyword, and the display unit 15 displays a map of "Shinjuku" sent from the Web site 19.

In this way, by the user inputting a keyword, the Web information providing system 10 according to the present invention displays a link destination address to a Web site or content providing a service such as map provision or hotel reservations related to this keyword, and a required service can be obtained by the user selecting a link destination address according to the service for which provision is received.

Such a Web information providing system 10 can be implemented in various forms, and as one example thereof, can be configured by incorporating the function of the Web information providing system 10 into an information terminal device as an application program. As the information terminal device in this case, so long as being an information system capable of executing the application program, naturally personal computers, as well as mobile telephones, PDAs, TV sets, etc. that can connect with the internet are applicable.

Hereinafter, the present invention will be described in detail by an embodiment arrived at using a mobile phone as the application example of an information system capable of executing the application program.

Figure 2:
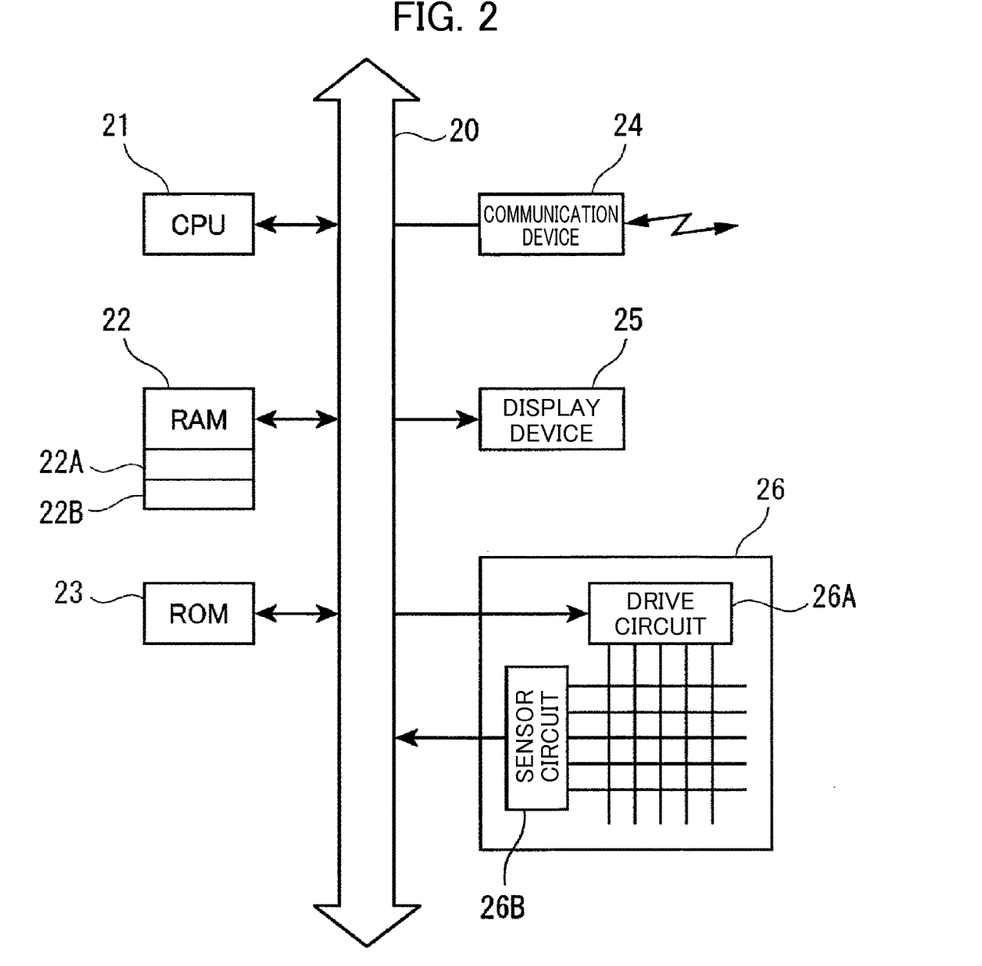
FIG. 2 is a block diagram showing an embodiment of a mobile telephone of the Web information providing system according to the present invention.

FIG. 2 schematically shows the configuration of a mobile telephone 1, which is configured by connecting a CPU 21, RAM 22, ROM 23, communication device 24, display device 25 and touch screen input device 26 to a system bus 20.

The touch screen input device 26 senses a touch to the touch screen's screen displayed on the display device 25 by capacitance change, and is configured to arrange over the touch screen's screen a drive line from a driver circuit 26A and an input line to the sensor circuit 26B over the touch screen's screen in a matrix.

The basic OS of the mobile telephone 1 and the application program of the Web information provider are stored in the ROM 23, and the user can select to activate and end this application program. In addition, a storage area 22A of saved data of a database 16 illustrated in FIG. 1 and a storage area of a data table 17 are respectively established in the RAM 22.

Figure 3:
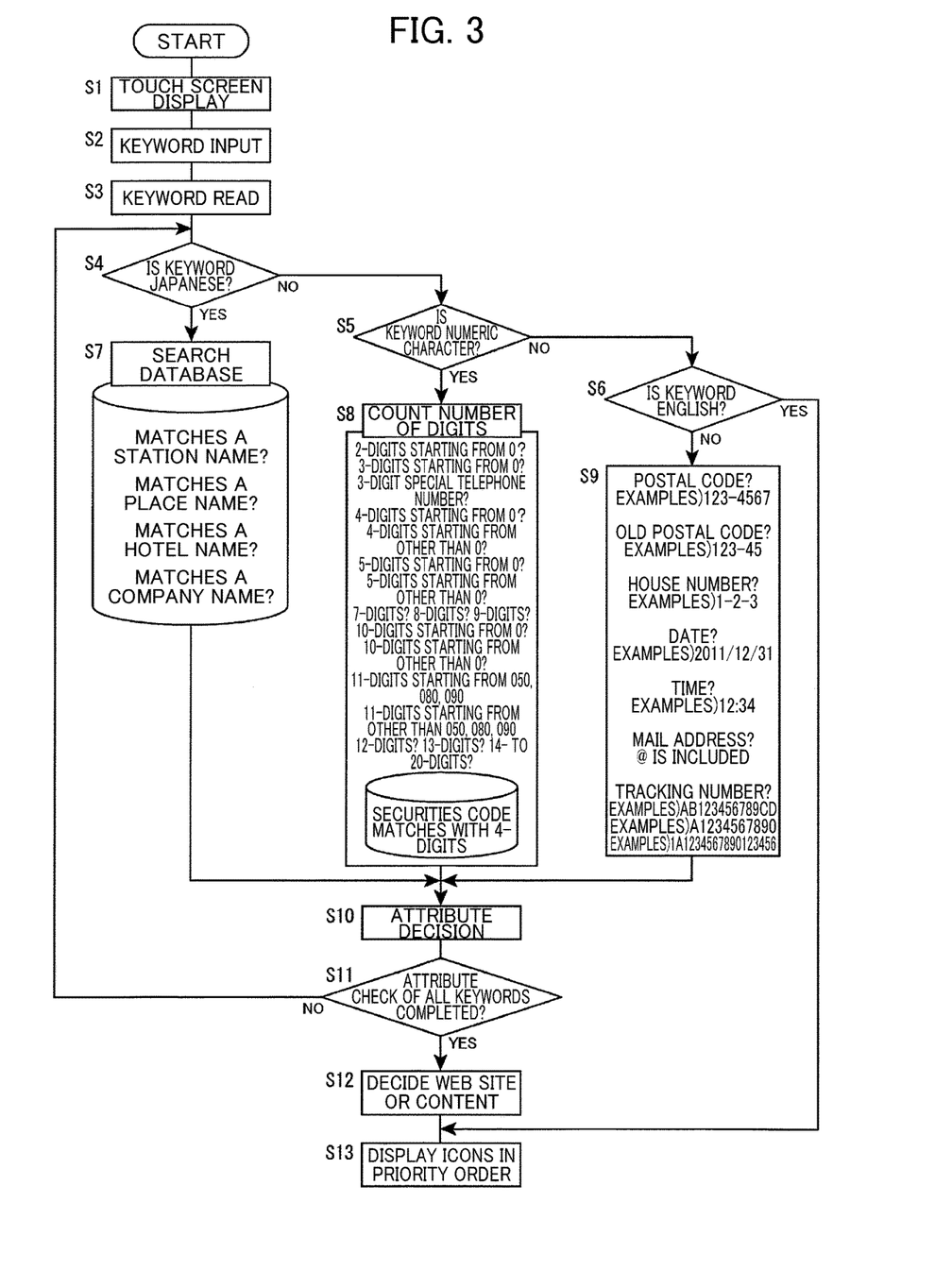
FIG. 3 is a flowchart showing operational steps in the embodiment of the mobile telephone of the present invention.

Operation of the CPU 21 will be explained, showing the control flow of the application program of Web information provider in FIG. 3.

Figure 4:
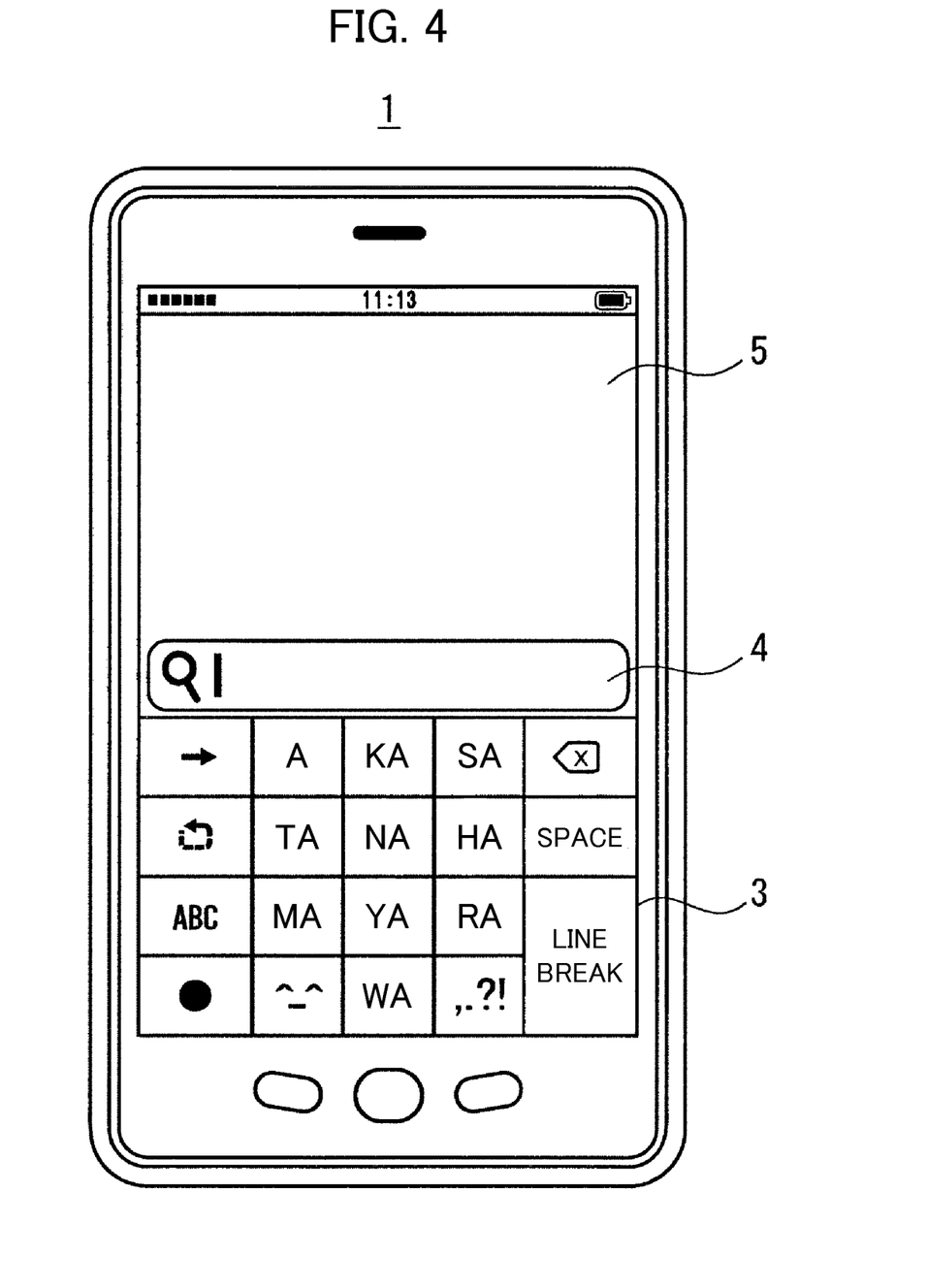
FIG. 4 is an explanatory drawing of a display screen of the mobile telephone during keyword input.

When the application program of the Web information provider is activated, the CPU 21 displays the touch screen on the display device 25 in Step S1, and controls the touch screen input device 26 to standby for input of a keyword in Step S2. FIG. 4 shows the display screen of the display device 25 in this state, and the input screen 3, input box 4, and search result display screen 5 are displayed by the touch screen. It should be noted that, at this time, the search result display screen 5 is in a non-display state due to being before search.

Then, the user operates the input screen 3 to input a keyword in the input box 4; however, at this time, in the case of inputting a plurality of keywords, the user will provide a space between keywords. Then, when the input by the user to the input box 4 ends, the keyword is read in Step S3. In subsequent Step S4, it is determined whether the read keyword is a language (Japanese), and in the case of not being a language, it is determined whether the keyword is constituted completely by numeric characters in Step S5, and in the case of not being completely constituted by numeric characters, it is determined whether the keyword is a completely alphabetic in Step S6.

When determining in Step S4 that the keyword is a language, the processing advances to Step S7, and enters processing to determine the contents expressed by the keyword. In Step S7, matching with nouns such as station names, place names, hotel names and company names stored in the database storage area 22A is compared. As described above, if inputting "Shinjuku" into the keyword, the attribute of the keyword is decided as "station name" or "place name" in Step S10 due to matching with "Shinjuku" as station name data or place name data.

If the keyword is determined as being completely numeric characters in Step S5, the processing advances to Step S8 to enter processing of determining the contents expressed by the keyword. In Step S8, the number of digits of the numeric character sequence is counted, and the contents expressed by the sequence of the keyword is determined by the number of digits thereof and the numeric characters, etc. in specific digits. Then, in Step S10, the attribute thereof is decided from the contents of the determined keyword. When citing an example other than the aforementioned area code and securities code, there is a possibility of being a package tracking number if a 9-digit or 14- to 20-digit numeric character, "parcel delivery" is selected from among predetermined attributes and decided as the attribute of this keyword, and if 13 digits, there are possibilities of being each of a JAN (Japanese Article Number) code or ISBN (International Standard Book Numbering) code, and "merchandise" and "book" are selected from among the predetermined attributes, and decided as the attributes of this keyword.

If determined that the keyword is not completely alphabetic in Step S6, in this case, it can be determined if the keyword is a combination of numeric character, symbol and alphabet. Therefore, it enters the processing of Step S9 to determine the contents expressed by this keyword. When citing an example other than the aforementioned postal code, a keyword in which the first and last two digits interposing 9-digit numeric character are alphabetic character strings has a possibility of being a certain package tracking number that is defined differently from that described above, and a character string containing "@" has a possibility of being a mail address, and based on the determination results thereof, any attribute determined in advance is decided in Step S10.

When deciding the attribute in Step S10 in this way, it is determined if attributes are decided for all keywords inputted in the input box 4 with half-width character spaces in Step S11, and in the case of not being decided for all, it returns to the processing from Step S4.

Then, it enters the processing of Step S12 when deciding attributes, the related Web site or content is decided according to the decided attribute, and in Step S13, the link destination data of this Web site or content is displayed by an icon. At this time, in the case of there being a plurality of link destination data sets, they are displayed in a predetermined priority order. The priority order is decided according to attribute and, for example, is programmed so that the link destination data of a Web site or content providing map information becomes the top of the priority order, in the case of the attribute being "place name".

Figure 5:
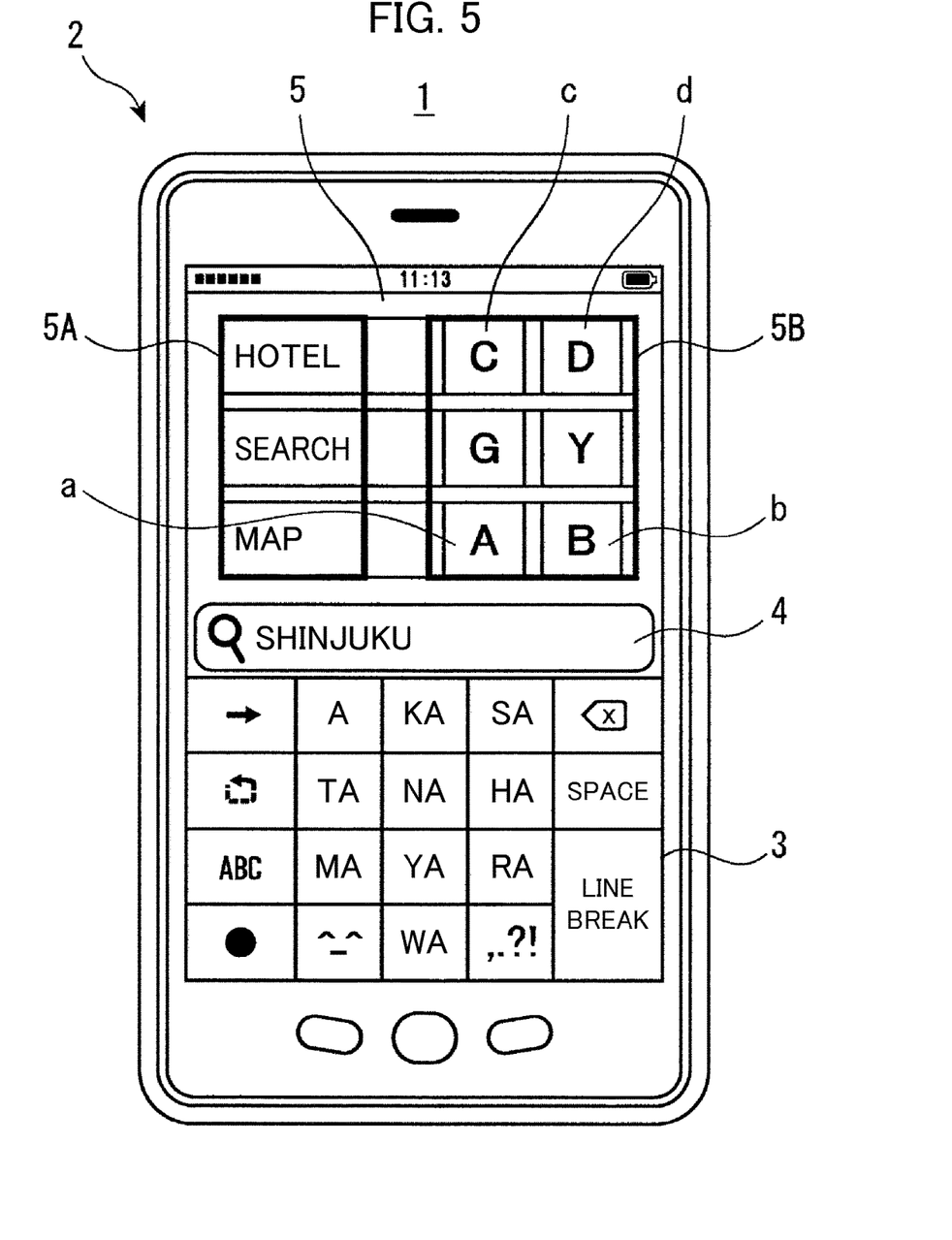
FIG. 5 is an explanatory drawing of a display screen of the mobile telephone displaying search results.

FIG. 5 shows a specific example of an icon display of link destination data in the processing of Step S13. In the example of FIG. 5, a state is shown in which "Shinjuku" is inputted as a single keyword, and the search results of a Web site or content providing a service related to "Shinjuku" is thereby displayed on the search result display screen 5. A category display part 5A of the search result display screen 5 displays services that can be provided by this Web site or content to be sorted into each category, and the link destination data to the Web site or content providing this service are displayed by icon in accordance with the sorting of categories.

In this example, since the attribute is "station name" or "place name" as mentioned above in relation to the keyword of "Shinjuku", based thereon, an icon a and icon b of map search sites A and B are displayed in the category of "maps", and an icon c and icon d of hotel reservation sites C and D are displayed in the category of "hotels".

In addition, irrespective of the attribute of the keyword, it is programmed so as to display the category of "search", and to collectively display icons g and y of search sites G and Y equipped with search engines in Step S13. In a case such as only inputting "Shinjuku" in keyword, the category of "search" is displayed with high priority order in order to also consider that the user desires the provision of general information and knowledge regarding "Shinjuku".

Then, irrespective of the presence of link destination data of a Web site or content being displayed, it is programmed so as to display the category of "search", and from this, in the case of link destination data like that corresponding to the inputted keyword not being found, since link destination data of search sites is displayed, it is sufficiently convenient for the user to quickly move to the next operation by directly accessing the search site.

In addition, when determining that the keyword is entirely alphabetic in Step S6, it is programmed so as to advance to Step S13, and by displaying the category display of "search" and the link destination data of the search site, to perform a search with this alphabetic keyword if a search site is selected.

In the present example, although the language is only established as Japanese, if English is also enabled, when determined that the keyword is entirely alphabetic in the processing of Step S6, a step of determining the contents expressed by a keyword in English similarly to the case of Japanese in Step S7 is added. In this case, a noun DB corresponding to English becomes necessary.

Figure 6:
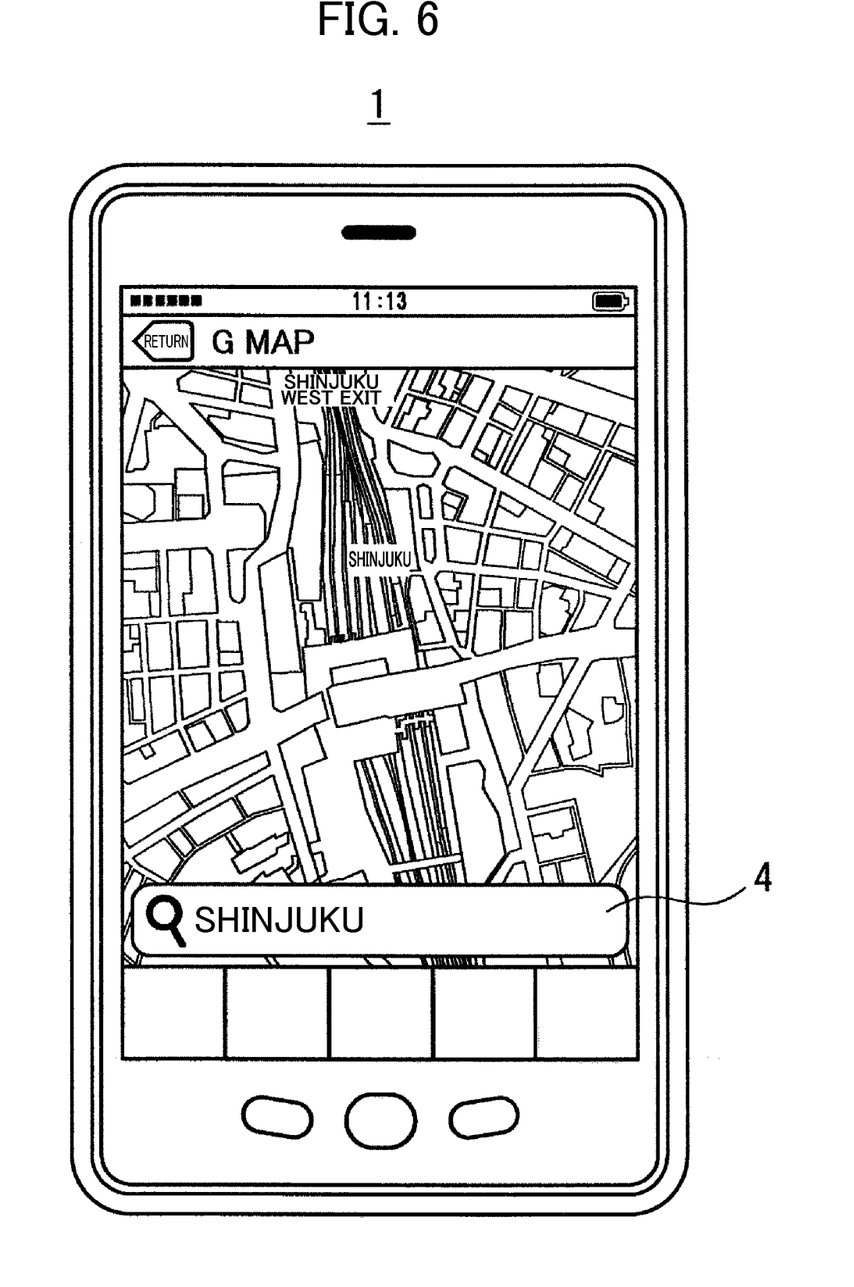
FIG. 6 is an explanatory drawing of the display screen of the mobile telephone displaying map information.

In the display state of FIG. 5, the CPU 21, if detecting that the icon a of the map search site A is selected by tapping through a signal from the touch screen input device 26, then controls the communication device 24, accesses this map search site A and sends an instruction so as to display a map of Shinjuku, whereby the display unit 15 displays a map of Shinjuku sent from the map search site A on the display device 25. At this time, the display screen of the mobile telephone 1 is displaying a map excluding the input box 4 as shown in FIG. 6.

Figure 7:
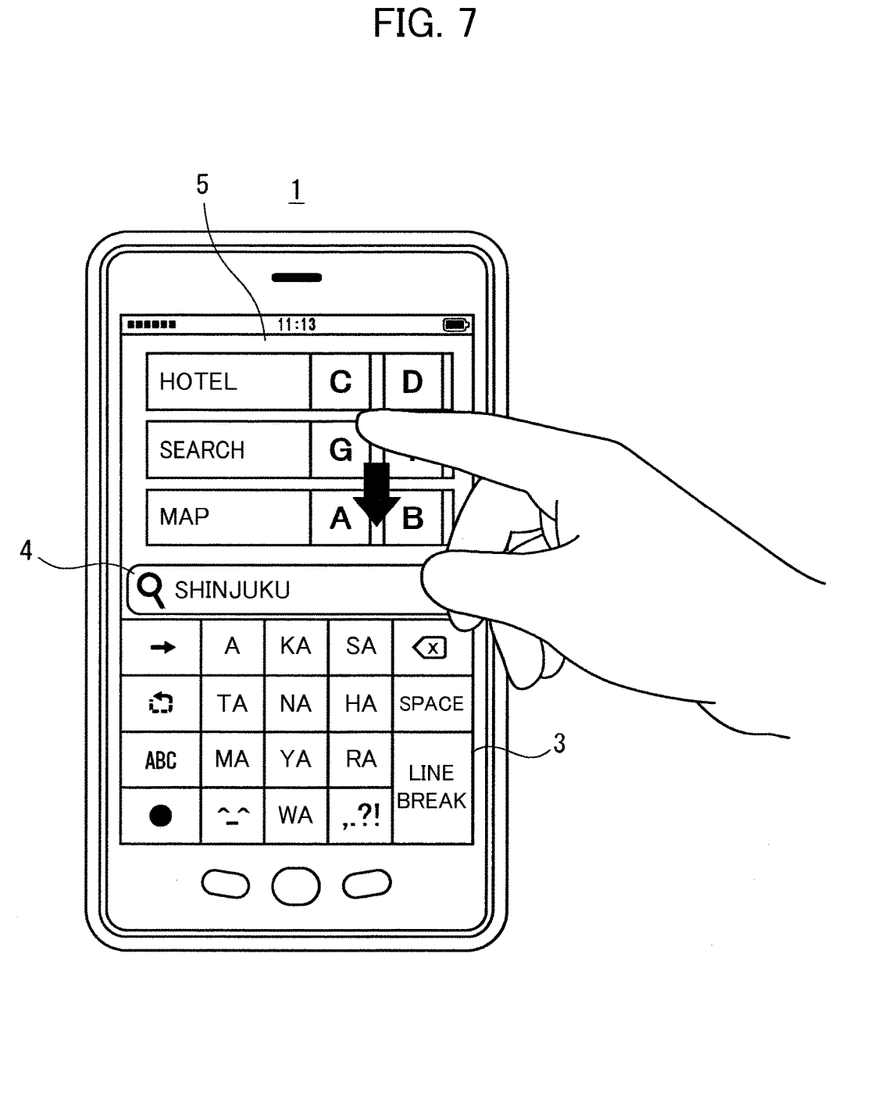
FIG. 7 is an explanatory drawing of a scroll operation on the display screen of the mobile telephone.
Figure 8:
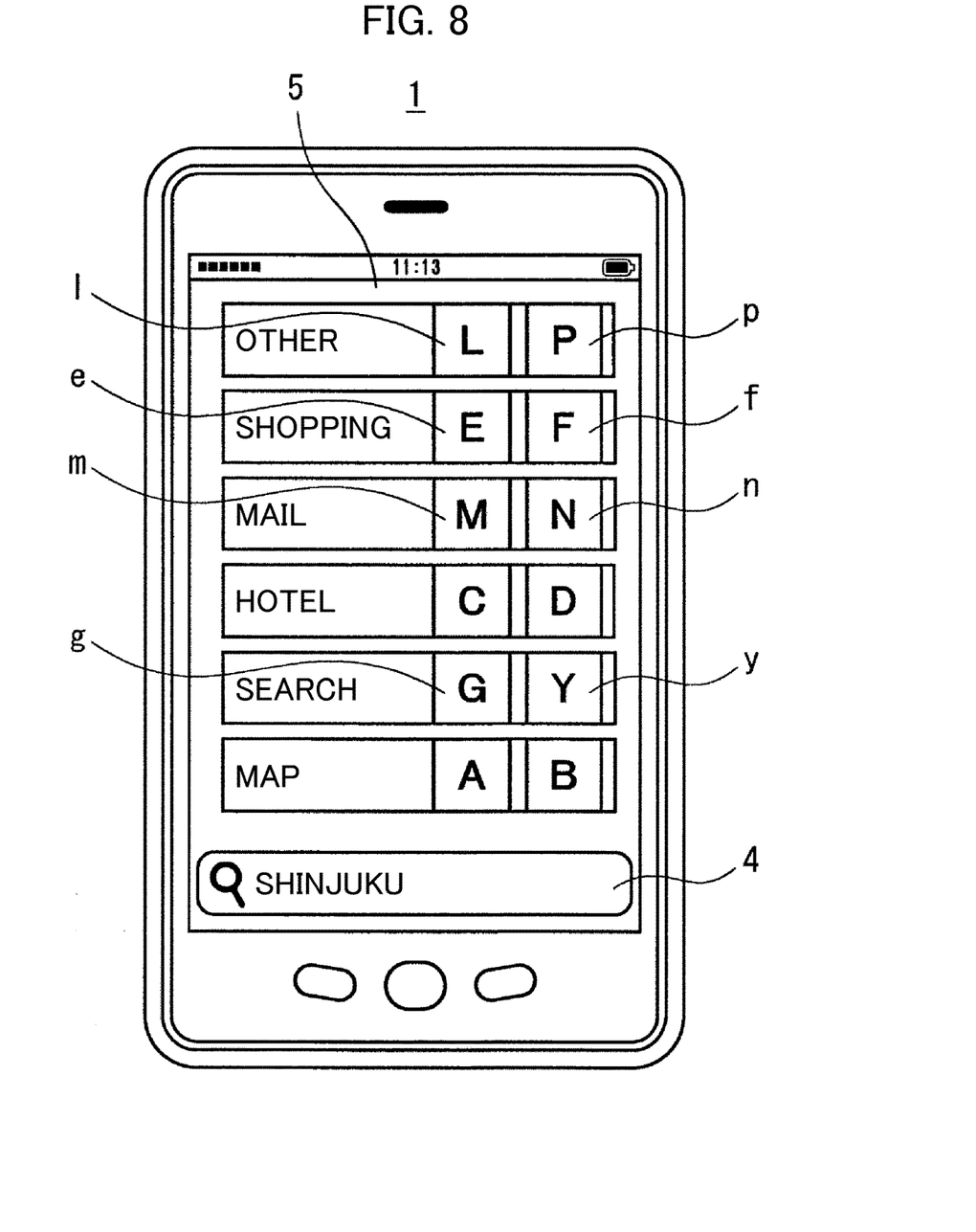
FIG. 8 is an explanatory drawing of the display screen of the mobile telephone displaying search results.

In addition, the display of icons in FIG. 5 is arranged so that the categories of high priority order are positioned close to the input box 4 in the processing of Step S13. Consequently, when scrolling the screen by a screen touch as shown in FIG. 7, the input screen 3 fades, the input box 4 moves lower, and the region of the search result display screen 5 widens, an icon e and icon f of the Web sites or contents E and F belonging to the category of "shopping" having low order are displayed, and further, an icon 1 and icon p of the Web sites or contents L and P providing services related to "Shinjuku" are also displayed in the field of the category of "other" (FIG. 8). At this time, in the case of a Web site or content having a direct relationship with "Shinjuku" not being displayed in the category of "other", the category of "other" is made unselectable.

It should be noted that, in the present example, while executing the application program for Web information provision, for convenience, it is programmed so as to provide a category of "mail" in the category display part 5A and display icons m and n selecting mail software M or mail software N, for the user to carry out mail handling.

Figure 9:
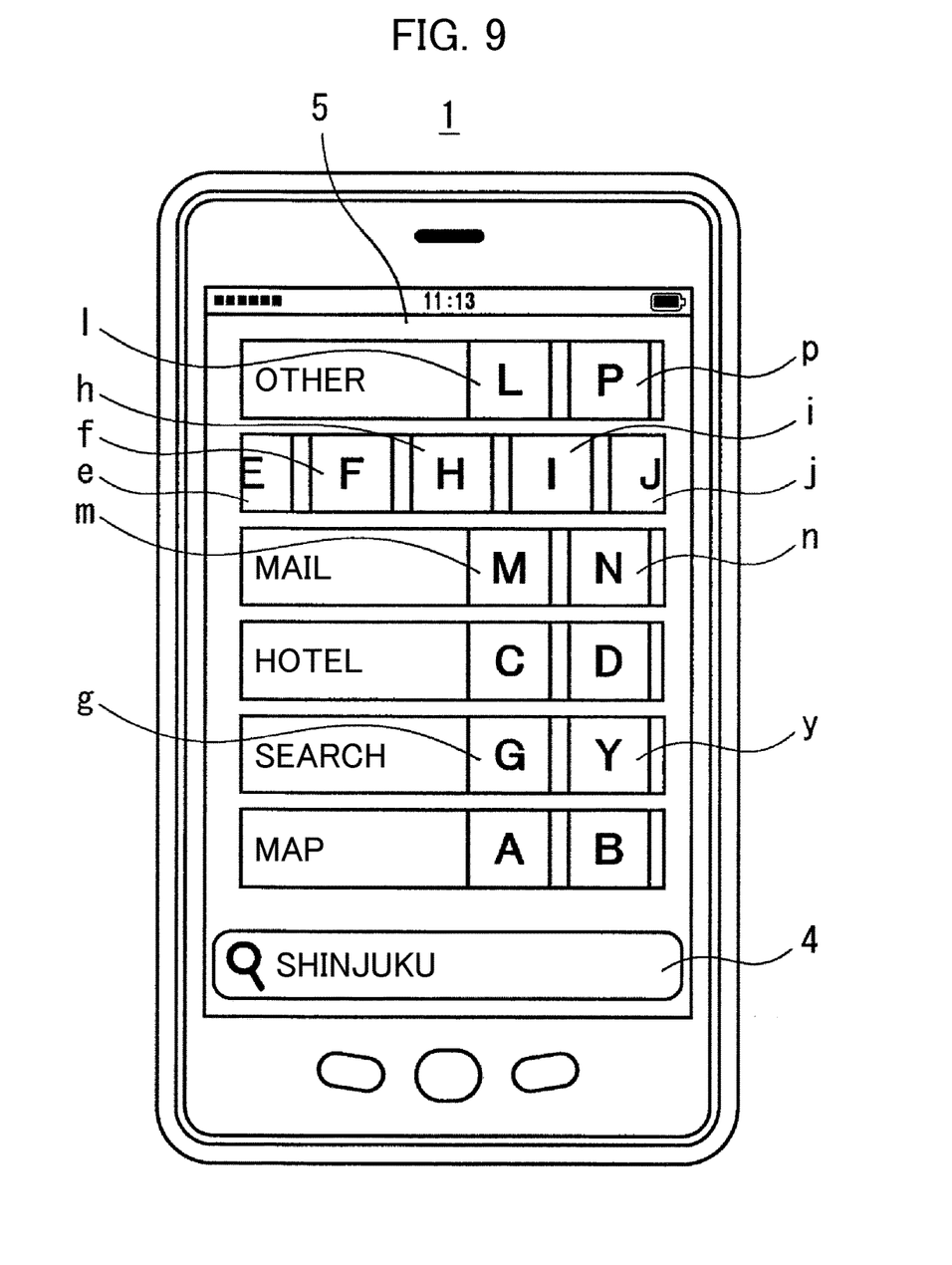
FIG. 9 is an explanatory drawing of the display screen of the mobile telephone displaying search results.

The icons of Web sites and contents in each category are displayed in priority order from the left in the processing of Step S13, and although the category of "shopping" displays the icon e and icon f of the Web sites or contents E and F in FIG. 8, when tapping a blank space to the right of the icon f, or performing scrolling in the transverse direction, the icons h, i and j of the Web sites or contents H, I and J that are in low order are also displayed. In this case, if detecting tapping or scrolling in a blank space by a signal from the touch screen input device 26, the CPU 21 controls the display device 25 to erase the category display of "shopping", and cause the icon e to icon j to be displayed in all of the rows as shown in FIG. 9. In the case of a scroll operation, the ease of use improves due to being able to instantly confirm a sequence of icons by a scroll to the left or right.

Figure 10:
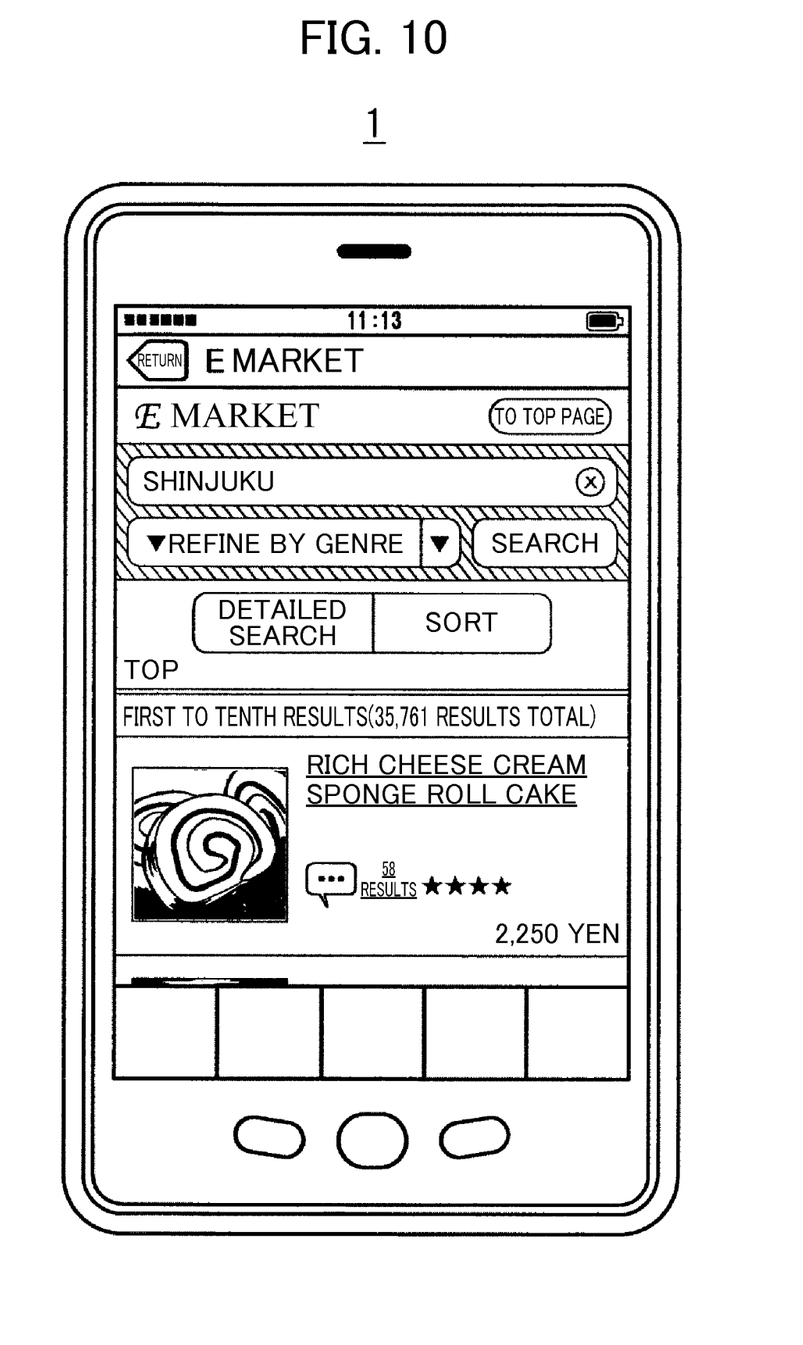
FIG. 10 is an explanatory drawing of the display screen of the mobile telephone displaying a Web page of an accessed Web site.

Then, if the icon e of the Web site E is tapped, the CPU 21 controls the communication device 24 to access the Web site E, and displays a Web page thereof on the display device 25 (FIG. 10). This Web site E is a shopping site on the internet, and is a Web site of a famous shop in Shinjuku.

When citing a further example, if determining the possibility of the keyword being a package tracking number in Step S8, and deciding the attribute as "package tracking" in Step S10, the icon of the Web site of a courier is displayed in Step S13. Then, if detecting that the icon of the Web site of the courier is selected by a tap with a signal from the touch screen input device 26, the CPU 21 controls the communication device 24 to access the Web site of this courier. Data such as transport status of a package based on the package tracking number is displayed on the display screen, and the user can thereby make confirmation.

In the case of there being a plurality of keywords, although the processing from Step S4 to Step S11 is repeated to decide attributes for every keyword, for example, if two keywords are "Dougenzaka" and "1-1", the attribute of "Dougenzaka" is decided as "place name" and the attribute of "1-1" is decided as "house number", and icons of map search sites are displayed according to the combination of these attributes in Step S12. Then, according to the selection of this icon, the display device 25 displays a map of "Dougenzaka 1-1".

In addition, when determining the keywords inputted in the input box 4 as being a combination of numeric characters and symbols, for example, there is a possibility of being a date if connecting numeric characters with a slash such as "2011/12/31", and if connecting numeric characters with a colon such as "12:00", when deciding the attribute as "date" or "time" in Step S9, the CPU 21 displays a schedule of a corresponding date or time.

More specifically, the mobile telephone 1 has a program of a calendar function stored in the ROM 23, displays an icon of this program in Step S13, and if this icon is selected, activates an application program of schedule management and displays a management page of dates and times on the display device 25. By inputting a combination of numeric characters and symbols expressing a time or date in this way, a calendar is activated during execution of the application program of Web information provision, whereby confirmation of a schedule can be quickly performed.

The Web information providing system and Web information providing program according to the present invention described above determine, from the format of entry of an inputted keyword, the contents expressed by this keyword, decides the attribute of the keyword from the contents thereof, and then displays link destination data of a Web site or content providing a service according to this attribute. Consequently, the user, when inputting a keyword, can simply search various Web sites providing services such as a map information providing service, hotel reservation service, confirmation service for package transport status, and search service; therefore, by simply selecting the desired link destination data thereafter, it is possible to easily access the Web site providing a required service.

The present invention is not limited to the above-mentioned embodiment and can be implemented with a variety of modifications. For example, although explained with a mobile telephone having a touch screen, the input device is not limited to a touch screen, and may be various devices such as a mouse and keyboard equipped by an information terminal device incorporating the application program for Web information provision as input devices. In addition, other than configuring to incorporate the functions of the Web information providing system 10 as an application program to an information terminal device such as the mobile telephone 1 as described above, it may be a configuration that keeps the functions of the entry decision unit 12, attribute decision unit 13, search unit 14, database 16 and data table 17 of the Web information providing system 10 in a server, and accesses this server through an information terminal device having a key input unit 11, display unit 15 and access unit 18. Alternatively, it is possible to appropriately modify and implement so long as not deviating from the intended scope of the present invention.

INDUSTRIAL APPLICABILITY

The present invention is a Web information providing system and Web information providing program that search for a Web site or content providing a service according to a keyword inputted by a user, and display link destination data, and thus have industrial applicability.

The invention claimed is:

1. A Web information providing system comprising:
   a plurality of databases including a first database, a second database and a third database, the first to third databases being directed to a first entry format, a second entry format and a third entry format of keyword, respectively, the first entry format being noun, the second entry format being numeric data, the third entry format being a combination of character/symbol/alphabet, each of the first to third databases containing attribute information associated with the keyword in the corresponding entry formats, the attribute information defining predetermined targeted areas and being used for selecting a data table of a target area in the predetermined target areas for searching Web sites related to the keyword of the corresponding entry formats; and
   a Web information providing device connected to the plurality of databases via a network, the Web information providing device including:
      a display unit;
      a keyword input device to which a keyword for searching is inputted;
      a storage device that stores a plurality of data tables each directed to the attribute information contained in the first to third databases and containing Website destination information of Web sites associated with the attribute information;
      a processor configured to function as:
         an entry decision unit receiving an input of the keyboard from the keyword input device and determining whether an entry format of the keyword inputted is the noun, the numeric data or the combination of character/symbol/alphabet;
         an attribute decision unit selecting only one of the first to third databases that corresponds to the determined entry format of the inputted keyword, searching the inputted keyword in the selected one of the first to third databases, and determining the attribute information in the selected one of the first to third databases that corresponds to the inputted keyword;
         a search unit selecting one of the plurality of data tables stored in the storage device based on the attribute information determined by the attribute decision unit, searching for the Website destination information of a Web site in the selected one of the plurality of data tables, and displaying a search result of the Web site destination information on the display unit; and
         an access unit receiving a selection of a Web site destination information in the displayed search result and accessing a corresponding Web site according to the selected Web site destination information displayed by the display unit.

2. The Web information providing system according to claim 1, wherein the access unit instructs provision of a service indicated by display contents of the keyword to the Web site being accessed.

3. The Web information providing system according to claim 1, wherein the attribute decision unit, if contents expressed by the inputted keyword match the noun stored in advance, decides the attribute information of the inputted keyword based on the noun matched.

4. The Web information providing system according to claim 1, wherein the attribute decision unit, when the entry format of the inputted keyword is the numeric data, decides the attribute information of the inputted keyword based on the number of digits of the numeric data or the numeric data in a specific digit.

5. The Web information providing system according to claim 1, wherein the attribute decision unit, when the entry format of the inputted keyword is configured by the combination of character/symbol/alphabet, decides the attribute information of the inputted keyword based on a sequence of the combination.

6. The Web information providing system according to claim 1, wherein, when a plurality of keywords is inputted to the keyword input unit, the entry decision unit determines entry format for each of the inputted keywords, and the search unit searches for corresponding Web sites and contents based on a combination of the attributes information of each of the inputted keywords decided by the attribute decision unit.

7. The Web information providing system according to claim 1, wherein the display unit displays in a predetermined priority order in the case of there being Web site destination information for a plurality of the Web sites or the contents searched by the search unit.

8. The Web information providing system according to claim 1, wherein the display unit displays the Web site destination information of the Web site or the content searched by the search unit, as well as Web site destination information of a search site having a search engine.

9. The Web information providing system according to claim 1, wherein the display unit also displays second Web site destination information of the Web site having a search engine, irrespective of whether or not there is first Web site destination information of a Web site or the content being displayed.

10. The Web information providing system according to claim 1, wherein the display unit categorizes and displays the Web suite destination information.

11. The Web information providing system according to claim 1, wherein the Web site destination information is an icon.

12. The Web information providing system according to claim 1, further comprising a schedule input unit, when the attribute decision unit decides the attribute information of the inputted keyword as a date or time, inputting a schedule of the date or the time.

13. A Web information providing method comprising:
a step of providing a Web information providing device and a plurality of databases connected to the Web information providing device via a network, the plurality of databases including a first database, a second database and a third database, the first to third databases being directed to a first entry format, a second entry format and a third entry format of keyword, respectively, the first entry format being noun, the second entry format being numeric data, the third entry format being a combination of character/symbol/alphabet, each of the first to third databases containing attribute information associated with the keyword in the corresponding entry formats, the attribute information defining predetermined targeted areas and being used for selecting a data table of a target area in the predetermined target areas for searching Web sites related to the keyword of the corresponding entry formats, the Web information providing device including a display unit, a keyword input device, a storage device that stores a plurality of data tables each directed to the attribute information contained in the first to third databases and containing Web site destination information of Web sites associated with the specific attribute information, and a processor;
a step of receiving an input of a keyword from the keyword input device;
a step of determining whether an entry format of the inputted keyword is the noun, the numeric data or the combination of character/symbol/alphabet by a processor;
a step of selecting only one of the first to third databases that corresponds to the determined entry format of the inputted keyword, searching the inputted keyword in the selected one of the first to third databases, and determining the attribute information in the selected one of the first to third databases that corresponds to the inputted keyword by the processor;
a step of selecting one of the plurality of data tables stored in the storage device based on the attribute information determined by the attribute decision unit, searching for the Website destination information of a Web site in the selected one of the plurality of data tables;
a step of displaying the Web site destination information of the Web site or the content thus searched on the display unit; and
a step of receiving a selection of a Web site destination information in the displayed search result and accessing a corresponding Web site according to the displayed Website destination information.

14. The Web information providing method according to claim 13, wherein, in a case of there being Web site destination information of a plurality of the Web site or the content thus searched, displaying in a predetermined priority order.

15. The Web information providing method according to claim 13, wherein the step of determining the attribute information of the inputted keyword, if the contents expressed by the inputted keyword match the noun stored in advance, decides the attribute information of the inputted keyword from the noun matched.

16. The Web information providing method according to claim 13, wherein the step of determining the attribute information of the inputted keyword, when the entry format of the inputted keyword is numeric data, decides the attribute information of the inputted keyword based on the number of digits of the numeric data or a numeric data in a predetermined digit.

17. The Web information providing method according to claim 13, wherein the step of determining the attribute information of the inputted keyword, when the entry format of the inputted keyword is configured by the combination of character/symbol/alphabet, decides the attribute information of the inputted keyword based on a sequence thereof.

* * * * *